United States Patent
Li et al.

(10) Patent No.: US 11,146,799 B2
(45) Date of Patent: Oct. 12, 2021

(54) METHOD AND APPARATUS FOR DECODING VIDEO BITSTREAM, METHOD AND APPARATUS FOR GENERATING VIDEO BITSTREAM, STORAGE MEDIUM, AND ELECTRONIC DEVICE

(71) Applicant: ZTE Corporation, Shenzhen (CN)

(72) Inventors: Ming Li, Shenzhen (CN); Zhao Wu, Shenzhen (CN); Ping Wu, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/957,760

(22) PCT Filed: Dec. 19, 2018

(86) PCT No.: PCT/CN2018/122052
§ 371 (c)(1),
(2) Date: Jun. 25, 2020

(87) PCT Pub. No.: WO2019/137171
PCT Pub. Date: Jul. 18, 2019

(65) Prior Publication Data
US 2020/0351507 A1    Nov. 5, 2020

(30) Foreign Application Priority Data
Jan. 10, 2018 (CN) .......................... 201810023101.9

(51) Int. Cl.
*H04N 19/174* (2014.01)
*H04N 19/44* (2014.01)
(Continued)

(52) U.S. Cl.
CPC ........... *H04N 19/174* (2014.11); *H04N 19/44* (2014.11); *H04N 19/70* (2014.11); *H04N 19/85* (2014.11)

(58) Field of Classification Search
CPC ...... H04N 19/174; H04N 19/44; H04N 19/70; H04N 19/85; H04N 19/119; H04N 19/597;
(Continued)

(56) References Cited

U.S. PATENT DOCUMENTS

2015/0201202 A1*  7/2015  Hattori ................... H04N 19/70
                                                           375/240.02
2016/0249056 A1*  8/2016  Tsukuba ................. H04N 19/30
(Continued)

FOREIGN PATENT DOCUMENTS

CN    101313578 A    11/2008
CN    102595119 A     7/2012
(Continued)

OTHER PUBLICATIONS

International Search Report for corresponding application PCT/CN2018/122052 filed Dec. 19, 2018; dated Mar. 21, 2019.
(Continued)

*Primary Examiner* — Tat C Chio
(74) *Attorney, Agent, or Firm* — Cantor Colburn LLP

(57) ABSTRACT

A method and apparatus for decoding a video bitstream, a method and apparatus for generating a video bitstream, storage medium and an electronic device are provided. The method for decoding the video bitstream includes that: a first parameter of a reference position of a slice in a video picture is acquired; a second parameter of the slice is acquired, the second parameter being used for determining a starting position of the slice in the video picture; and a starting position coordinate parameter of the slice in the video
(Continued)

picture is calculated according to the first parameter and the second parameter.

17 Claims, 5 Drawing Sheets

(51) Int. Cl.
   *H04N 19/70* (2014.01)
   *H04N 19/85* (2014.01)
(58) Field of Classification Search
   CPC .............. H04N 19/167; H04N 21/6587; H04N 21/2353; H04N 21/816; H04N 21/4728; H04N 19/59; H04N 21/23439
   See application file for complete search history.

(56) References Cited

U.S. PATENT DOCUMENTS

2016/0255354 A1  9/2016  Yamamoto
2017/0346873 A1  11/2017  Denoual

FOREIGN PATENT DOCUMENTS

| CN | 103780920 A | 5/2014 |
| CN | 106233745 A | 12/2016 |
| EP | 2472867 A1 | 7/2012 |

OTHER PUBLICATIONS

European Search Report for corresponding application EP 18 90 0484; Report dated Dec. 10, 2020.

Hyun-Mook Oh, "Joint Collaborative Team on Video Coding (JCT-VC) of ITU-T SG 16 WP 3 and ISO/IEC JTC 1/SC 29/WG 11", Oct. 19-25, 2017.

Jill Boyce, "HEVC Additional Supplemental Enhancement Information (Draft 4)", Oct. 19-25, 2017.

R. Skupin, "Joint Collaborative Team on Video Coding (JCT-VC) of ITU-T SG 16 WP 3 and ISO/IEC JTC 1/SC 29/WG11", Jul. 15-21, 2017.

* cited by examiner

METHOD AND APPARATUS FOR DECODING VIDEO BITSTREAM, METHOD AND APPARATUS FOR GENERATING VIDEO BITSTREAM, STORAGE MEDIUM, AND ELECTRONIC DEVICE

TECHNICAL FIELD

The present disclosure relates to the field of communication, and particularly to a method and apparatus for decoding a video bitstream, a method and apparatus for generating a video bitstream, a storage medium and an electronic device.

BACKGROUND

In a related art, during streaming of media by a streaming media application, one or more bitstreams with different resolutions may be extracted from a video bitstream with high-resolution pictures so that the video bitstream can adapt to terminal devices with different decoding capabilities and multiple different application scenarios, for example, an interactive ultra-high-definition television and dynamic interactive video on demand. For an application using a panoramic video or a 360-degree video, a server may dynamically send, according to a viewing requirement of the user provided by a terminal, a sub bitstream including content specified to be viewed by a user and extracted from a complete bitstream to the user of the terminal. The server may extract the corresponding sub bitstream from the complete bitstream in real time according to the viewing requirement of the user provided by the terminal, and the server may also extract sub bitstreams from the complete bitstream in advance and dynamically select and send the corresponding sub bitstream according to the viewing requirement of the user provided by the terminal.

In the related art, a slice is one of the basic data units for organization of a bitstream in a mainstream video coding standard (for example, the Advanced Video Coding H.264/AVC standard and the High Efficiency Video Coding H.265/HEVC standard). In a coding process, a coder partitions a picture into one or more slices and codes the slices. A slice may correspond to a unit that may be independently decoded in the picture, and a decoding process of the slice may be independent of data of another slice in the same picture. By use of such a characteristic of the slice, a bitstream convenient for bitstream extraction may be generated, for example, a slice group using the H.264/AVC standard and a tile using the H.265/HEVC standard. The H.265/HEVC standard allows inclusion of one or more slices in a tile, and in such case, a tile may be used as a slice group (or a slice set). The H.265/HEVC standard also allows inclusion of one or more tiles in a slice, and in such case, a slice may be used as a tile group (or a tile set).

In the related art, in a decoding process of a slice, starting position information of the slice is required to be coded. Then, after data of the slice is decoded, a decoder may store a restored value of a pixel sampling value in the slice at a correct position of a restored picture buffer. In an existing mainstream video coding standard, a serial number (according to a raster scanning sequence) of a first coding block of a slice in a picture is used as position information of the slice in the picture. For example, in the H.264/AVC standard, a serial number of a first Macroblock (MB) of a slice in a picture is used as a position coordinate of the slice (a corresponding syntax unit is first_mb_in_slice). In the H.265/HEVC standard, whether a slice is a first slice in a picture or not is represented with a first flag bit (a corresponding syntax unit is first_slice_segment_in_pic_flag), and when the slice is not the first slice in the picture, a serial number of a first Coding Tree Block (CTB) in the slice in the picture is used as a position coordinate of the slice (a corresponding syntax unit is slice_segment_address).

Coding a video picture and performing sub bitstream extraction on a bitstream are two common bitstream generation processes. In a process of coding a video picture, a coder determines a position coordinate of each slice in the picture according to a picture resolution, a size of a coding block (a size of an MB is fixedly 16×16, and a size of a CTB is configurable) and a manner of dividing the picture into the slices. In a bitstream extraction process, a processing apparatus is required to parse a related syntax unit in a bitstream to be extracted, determine picture resolutions of the bitstream to be extracted and a sub bitstream, a size of a coding block and a manner of dividing a picture into slices, determine a position of a picture region corresponding to the sub bitstream in a picture corresponding to the bitstream to be extracted so as to calculate a position coordinate of each slice forming the picture region corresponding to the sub bitstream in the picture corresponding to the sub bitstream, and finally overwrites a value of a syntax unit corresponding to the position coordinate of the sub bitstream in slice header information of the extracted sub bitstream. Herein, the picture corresponding to the bitstream to be extracted refers to a video picture obtained by decoding the bitstream to be extracted, and the picture corresponding to the sub bitstream refers to a video picture obtained by decoding the sub bitstream. Under normal conditions, the picture corresponding to the sub bitstream is a picture region in the picture corresponding to the bitstream to be extracted. Particularly, for a panoramic video or a 360-degree video, the picture corresponding to the sub bitstream may also be formed by two or more nonadjacent regions in the picture corresponding to the bitstream to be extracted. Particularly, for the panoramic video or the 360-degree video, according to a raster scanning sequence, a sequence of the two or more nonadjacent regions in the picture corresponding to the bitstream to be extracted may be different from a sequence of the two or more nonadjacent regions in the picture corresponding to the sub bitstream.

Coding of starting position coordinate information of a slice in a picture can increase the calculation complexity of a process of determining a starting position coordinate of the slice in a sub bitstream, and also increase the complexity of the process of overwriting the starting position coordinate of the slice in a sub bitstream extraction process. During a practical application, these shortcomings of the methods in the related art increase the implementation complexity of an apparatus for processing a bitstream and reduce the bitstream processing efficiency.

SUMMARY

Embodiments of the present disclosure provide a method and apparatus for decoding a video bitstream, a method and apparatus for generating a video bitstream, storage medium and an electronic device.

According to an embodiment of the present disclosure, a method for decoding a video bitstream is provided, which may include: a first parameter of a reference position of a slice in a video picture is acquired; a second parameter of the slice is acquired, the second parameter being used for determining a starting position of the slice in the video picture; and a starting position coordinate parameter of the slice in the video picture is calculated according to the first parameter and the second parameter.

According to an embodiment of the present disclosure, a method for generating a video bitstream is provided, which may include: a first parameter is set according to a starting position of a first slice in a video picture; and the first parameter is written into a bitstream of a picture-layer data unit of the video picture.

According to another embodiment of the present disclosure, an apparatus for decoding a video bitstream is provided, which may include: a first acquisition module, configured to acquire a first parameter of a reference position of a slice in a video picture; a second acquisition module, configured to acquire a second parameter of the slice, the second parameter being used for determining a starting position of the slice in the video picture; and a calculation module, configured to calculate a starting position coordinate parameter of the slice in the video picture according to the first parameter and the second parameter.

According to another embodiment of the present disclosure, an apparatus for generating a video bitstream is provided, which may include: a setting module, configured to set a first parameter according to a starting position of a first slice in a video picture; and a generation module, configured to write the first parameter into a bitstream of a picture-layer data unit of the video picture.

According another embodiment of the present disclosure, a storage medium is also provided, in which a computer program may be stored, the computer program being configured to execute, when running, the operations in any abovementioned method embodiment.

According to another embodiment of the present disclosure, an electronic device is also provided, which may include a memory and a processor. A computer program may be stored in the memory. The processor may be configured to run the computer program to execute the operations in any abovementioned method embodiment.

Through the solution in the embodiments of the present disclosure, operations of recalculating a starting position of a slice in a picture in a sub bitstream obtained by extraction in a bitstream extraction process and overwriting starting position information of the slice in slice header information may be avoided, the technical problem in the related art that an apparatus for processing a bitstream has an over complex decoding process is solved, and the processing efficiency of the apparatus for processing the bitstream is improved.

BRIEF DESCRIPTION OF THE DRAWINGS

The drawings described here are adopted to provide a deeper understanding to the present disclosure and form a part of the present application. Schematic embodiments of the present disclosure and descriptions thereof are adopted to explain the present disclosure and not intended to form improper limits to the present disclosure. In the drawings.

DETAILED DESCRIPTION OF THE EMBODIMENTS

The present disclosure will be described below with reference to the drawings and in combination with the embodiments in detail. It is to be noted that the embodiments in the present application and characteristics in the embodiments may be combined without conflicts.

It is to be noted that the terms like "first" and "second" in the specification, claims and accompanying drawings of the present disclosure are used for differentiating the similar objects, but do not have to describe a specific order or a sequence.

Embodiment 1

Figure 1:
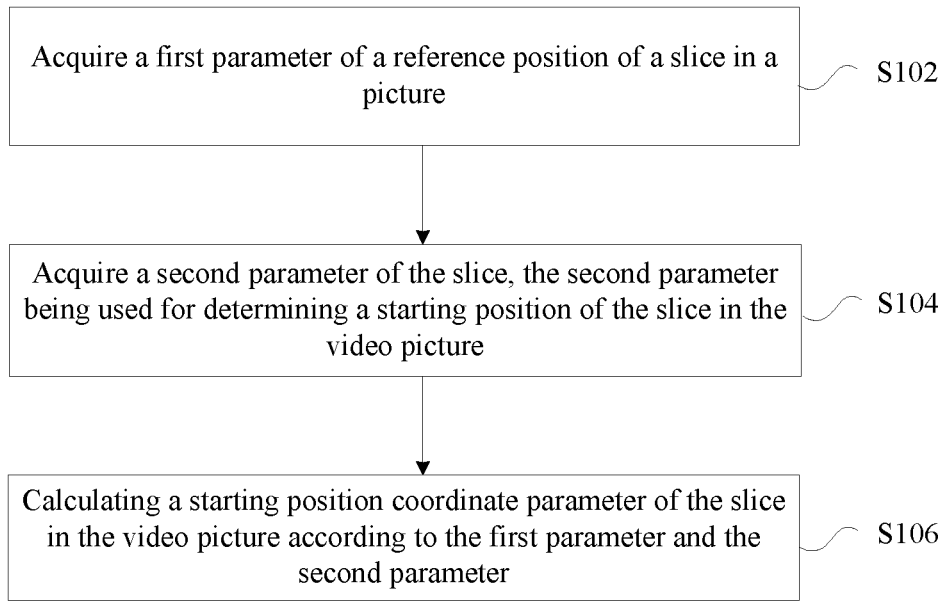
FIG. 1 is a flowchart of a method for decoding a video bitstream according to an embodiment of the present disclosure.

The embodiment provides a method for decoding a video bitstream. FIG. 1 is a flowchart of a method for decoding a video bitstream according to an embodiment of the present disclosure. As shown in FIG. 1, the flow includes the following operations.

In S102, a first parameter of a reference position of a slice in a picture is acquired.

In S104, a second parameter of the slice is acquired, the second parameter being used for determining a starting position of the slice in the video picture.

In S106, a starting position coordinate parameter of the slice in the video picture is calculated according to the first parameter and the second parameter.

Through the operations, operations of recalculating a starting position of a slice in a picture in a sub bitstream obtained by extraction in a bitstream extraction process and overwriting starting position information of the slice in slice header information may be avoided, the technical problem in the related art that an apparatus for processing a bitstream has an over complex decoding process is solved, and the processing efficiency of the apparatus for processing the bitstream is improved.

In at least one exemplary embodiment, an executer of the operations may include, but is not limited to, an apparatus for processing a video bitstream such as a related apparatus for generating a bitstream, and a receiving and playing apparatus in a video communication application, for example, a mobile phone, a computer, a server, a set-top box, a portable mobile terminal, a digital camera, a television broadcast system device, a content delivery network device and a media server.

In at least one exemplary embodiment, the operation that the first parameter of the reference position of the slice in the video picture is acquired includes: one or more first bitstreams corresponding to a picture-layer data unit in the video bitstream are parsed; and the first parameter is acquired from the one or more first bitstreams.

In an exemplary embodiment, multiple first bitstreams are obtained by parsing, and the operation that the first parameter is acquired from the multiple first bitstreams includes: the multiple first bitstreams are parsed to obtain multiple first parameters; identification information related to the picture-layer data unit and/or a reference relationship between multiple picture-layer data units are/is acquired; and one first parameter among the multiple first parameters is determined according to the identification information and/or the reference relationship. The finally determined first parameter may be complete and may also be obtained by combining the multiple first parameters.

In at least one exemplary embodiment, the identification information related to the picture-layer data unit is used for indicating the first parameter used in the process of calculating the starting position coordinate parameter of the slice in the video picture.

In at least one exemplary embodiment, the picture-layer data unit includes at least one of the following data units: a Video Parameter Set (VPS), a Sequence Parameter Set (SPS), a Picture Parameter Set (PPS), a sequence header, a picture header, a slice header and a picture-layer auxiliary information unit.

In at least one exemplary embodiment, the operation that the second parameter of the slice is acquired includes that: slice-layer header information of the video bitstream is parsed; and the second parameter is acquired from the slice-layer header information.

In the embodiment, the first parameter includes coordinate information of the video picture and stride information of the video picture, and the second parameter includes coordinate information of the slice.

In an exemplary embodiment, the operation that the starting position coordinate parameter of the slice in the video picture is calculated according to the first parameter and the second parameter includes the starting position coordinate parameter (SliceAddrX, SliceAddrY) being calculated according to the following formulae:

$$\text{SliceAddr}X = (\text{slice\_address\_}x - \text{pic\_slice\_address\_info\_}x0 + \text{pic\_slice\_address\_info\_stride\_width}) \% \text{pic\_slice\_address\_info\_stride\_width, and}$$

$$\text{SliceAddr}Y = (\text{slice\_address\_}y - \text{pic\_slice\_address\_info\_}y0 + \text{pic\_slice\_address\_info\_stride\_height}) \% \text{pic\_slice\_address\_info\_stride\_height,}$$

where SliceAddrX is a starting position coordinate of the slice in the video picture in a horizontal direction, SliceAddrY is a starting position coordinate of the slice in the video picture in a vertical direction, slice_address_x is a position coordinate of the slice in the horizontal direction, slice_address_y is a position coordinate of the slice in the vertical direction, pic_slice_address_info_x0 is a coordinate of the reference position of the slice in the video picture in the horizontal direction, pic_slice_address_info_y0 is a coordinate of the reference position of the slice in the video picture in the vertical direction, pic_slice_address_info_stride_width is a stride value of the video picture in the horizontal direction, and pic_slice_address_info_stride_height is a stride value of the video picture in the vertical direction. The arithmetic operator "%" as used herein is defined in the H.265/HEVC standard as modulus, i.e., x % y is the remainder of x divided by y, defined for integers x and y with x>=0 and y>0.

In another exemplary embodiment, when the first parameter does not include pic_slice_address_info_stride_height, a calculation method for SliceAddressY may be changed, and in such case, the operation that the starting position coordinate parameter of the slice in the video picture is calculated according to the first parameter and the second parameter includes the starting position coordinate parameter (SliceAddrX, SliceAddrY) being calculated according to the following formulae:

$$\text{SliceAddr}X = (\text{slice\_address\_}x - \text{pic\_slice\_address\_info\_}x0 + \text{pic\_slice\_address\_info\_stride\_width}) \% \text{pic\_slice\_address\_info\_stride\_width, and}$$

$$\text{SliceAddr}Y = \text{slice\_address\_}y - \text{pic\_slice\_address\_info\_}y0,$$

where SliceAddrX is a starting position coordinate of the slice in the video picture in a horizontal direction, SliceAddrY is a starting position coordinate of the slice in the video picture in a vertical direction, slice_address_x is a position coordinate of the slice in the horizontal direction, slice_address_y is a position coordinate of the slice in the vertical direction, pic_slice_address_info_x0 is a coordinate of the reference position of the slice in the video picture in the horizontal direction, pic_slice_address_info_y0 is a coordinate of the reference position of the slice in the video picture in the vertical direction, and pic_slice_address_info_stride_width is a stride value of the video picture in the horizontal direction.

Figure 2:
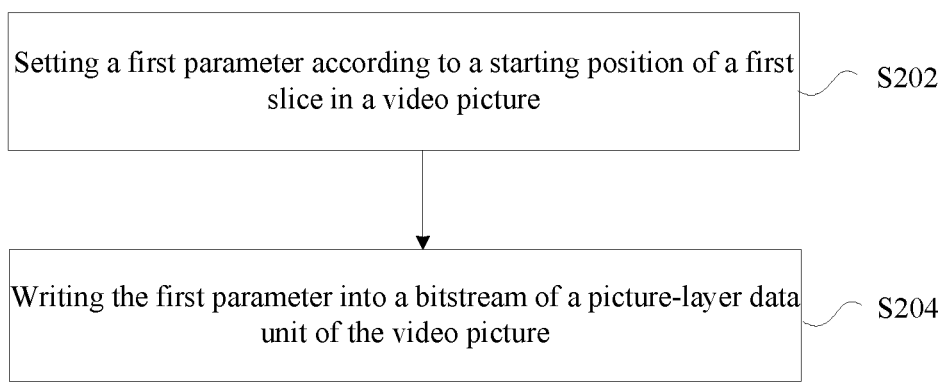
FIG. 2 is a flowchart of a method for generating a video bitstream according to an embodiment of the present disclosure.

The embodiment provides a method for generating a video bitstream. FIG. 2 is a flowchart of a method for generating a video bitstream according to an embodiment of the present disclosure. As shown in FIG. 2, the flow includes the following operations.

In S202, a first parameter is set according to a starting position of a first slice in a video picture.

In S204, the first parameter is written into a bitstream of a picture-layer data unit of the video picture.

In at least one exemplary embodiment, after the operation that the first parameter is written into the bitstream of the picture-layer data unit of the video picture, the method may further include that: a second parameter is calculated according to a starting position coordinate parameter of a slice in the video picture and the first parameter, and the second parameter is written into a bitstream corresponding to slice-layer header information, the second parameter being used for determining a starting position of the slice in the video picture.

In at least one exemplary embodiment, the operation that the first parameter is set according to the starting position of the first slice in the video picture includes that: a picture region where a picture corresponding to a sub bitstream is located in a picture corresponding to a bitstream to be extracted is determined, the picture corresponding to the sub bitstream being the video picture; and the starting position of the first slice in the video picture is determined, and the first parameter is calculated according to the starting position, the starting position of the first slice being a starting position coordinate of the first slice in the video picture in the picture corresponding to the bitstream to be extracted.

Through the above descriptions about the implementation modes, those skilled in the art may clearly know that the methods according to the embodiment may be implemented in a manner of combining software and a required universal hardware platform and, of course, may also be implemented through hardware, but the former is an exemplary implementation mode under many circumstances. Based on such an understanding, the technical solutions of the present disclosure substantially or parts making contributions to a conventional art may be embodied in the form of a software product. The computer software product is stored in a storage medium (for example, a Read-Only Memory (ROM)/Random Access Memory (RAM), a magnetic disk and an optical disk), including a plurality of instructions configured to enable a terminal device (which may be a mobile phone, a computer, a server, a network device or the like) to execute the method of each embodiment of the present disclosure.

Embodiment 2

The embodiment also provides an apparatus for decoding a video bitstream and an apparatus for generating a video bitstream, which are configured to implement the above-mentioned embodiment and exemplary implementation modes. What has been described will not be elaborated. For example, term "module" used below may be a combination of software and/or hardware capable of realizing a preset function. Although the apparatuses described in the following embodiment may be implemented with software, implementation with hardware or a combination of the software and the hardware is also possible and conceivable.

Figure 3:
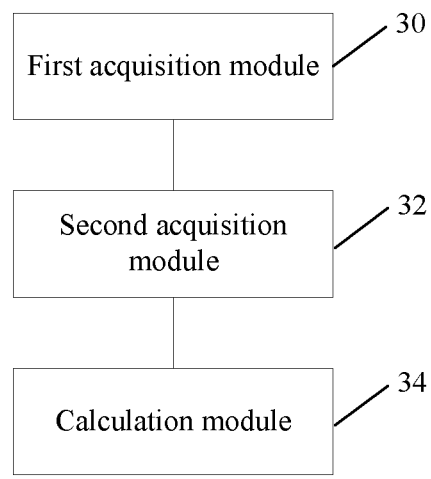
FIG. 3 is a structure block diagram of an apparatus for decoding a video bitstream according to an embodiment of the present disclosure.

FIG. 3 is a structure block diagram of an apparatus for decoding a video bitstream according to an embodiment of the present disclosure. As shown in FIG. 3, the apparatus includes:

a first acquisition module 30, configured to acquire a first parameter of a reference position of a slice in a picture;

a second acquisition module 32, configured to acquire a second parameter of the slice, the second parameter being used for determining a starting position of the slice in the video picture; and a calculation module 34, configured to calculate a starting position coordinate parameter of the slice in the video picture according to the first parameter and the second parameter.

Figure 4:
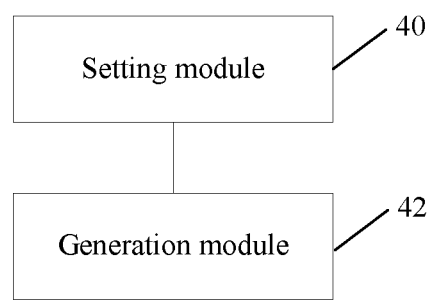
FIG. 4 is a structure block diagram of an apparatus for generating a video bitstream according to an embodiment of the present disclosure.

FIG. 4 is a structure block diagram of an apparatus for generating a video bitstream according to an embodiment of the present disclosure. As shown in FIG. 4, the apparatus includes:

a setting module 40, configured to set a first parameter according to a starting position of a first slice in a video picture; and a generation module 42, configured to write the first parameter into a bitstream of a picture-layer data unit of the video picture.

It is to be noted that each module may be implemented through software or hardware and, under the latter condition, may be implemented in, but not limited to, the following manner: the modules are all positioned in the same processor, or the modules are positioned in different processors in any combination form respectively.

Embodiment 3

The embodiment is an exemplary embodiment of the present application, and is adopted to explain and describe the solutions of the present application in combination with exemplary implementation modes in detail.

In the following embodiment, a video that a video picture belongs to may be a high-resolution video or a video of another style. The high-resolution video refers to a picture sequence formed by high-resolution pictures, and the high-resolution pictures may be video pictures with a high resolution such as high-definition video pictures, ultra-high-definition video pictures, panoramic video pictures and 360-degree video pictures. A bitstream refers to a bitstream generated by coding a high-resolution video by a video coder and also refers to a transmission stream and/or media file obtained by system-layer processing over the bitstream generated by coding the high-resolution video by the video coder and including the bitstream generated by coding the high-resolution video by the video coder, and the bitstream may be decoded to obtain the high-resolution video. System-layer processing refers to an encapsulation operation over the video bitstream. For example, the video bitstream is encapsulated into the transmission stream as a data load, or the video bitstream is encapsulated into the media file as a load. System-layer processing also includes encapsulating the transmission stream or media file including the video bitstream into a stream for transmission or a file for storage as a data load. A data unit generated by system-layer processing is also called a system-layer data unit, and information (for example, header information of the system-layer data unit) added into the system-layer data unit in the process of encapsulating the data load by system-layer processing is called system-layer information. A sub bitstream refers to a partial bitstream obtained by an extraction operation over a bitstream, the sub bitstream may be decoded to obtain a video picture, the video picture may be a picture with a resolution lower than a high-resolution video picture obtained by decoding the bitstream, and the video picture may include part of the content in the high-resolution video picture.

The embodiment provides methods and apparatuses for decoding a video picture bitstream and generating a bitstream, including a method and apparatus for decoding a bitstream and a method and apparatus for generating a bitstream. The method for decoding the bitstream includes that: a bitstream corresponding to a picture-layer data unit is parsed to obtain a first parameter of a starting position of a first slice in a picture; slice-layer header information is parsed to obtain a second parameter of a starting position of a slice in the picture; and a starting position coordinate parameter of the slice in the picture is calculated according to the first parameter and the second parameter. The method for generating the bitstream includes: a first parameter is set according to a starting position coordinate parameter of a first slice in a picture, and the first parameter is written into a bitstream corresponding to a picture-layer data unit. Therefore, operations of recalculating a starting position of a slice in a picture in a sub bitstream obtained by extraction in a bitstream extraction process and overwriting starting position information of the slice in slice header information may be avoided, and the processing efficiency of an apparatus for processing a bitstream is improved.

The embodiment also includes the following implementation modes.

Implementation Mode 1

Figure 5:
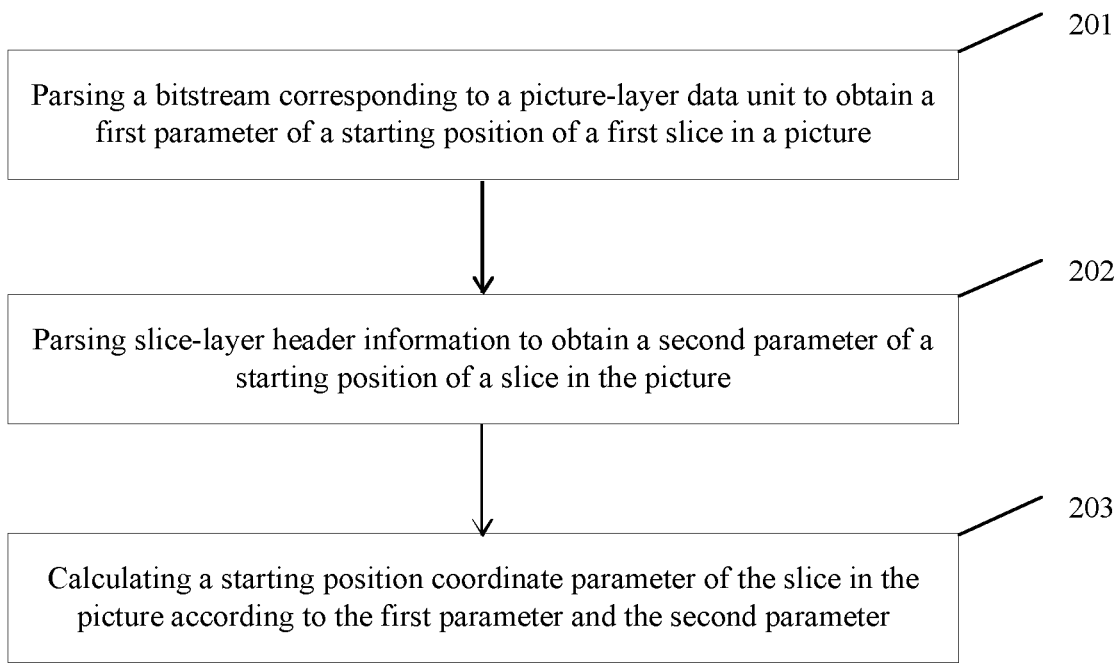
FIG. 5 is a schematic diagram of a decoding method according to an implementation mode.

FIG. 5 is a schematic diagram of a decoding method according to the implementation mode, as shown in FIG. 5, by use of a method of the implementation mode, a bitstream is decoded mainly through the following operations.

In operation 201, a bitstream corresponding to a picture-layer data unit is parsed to obtain a first parameter of a starting position of a first slice in a picture.

The picture-layer unit includes data used in a picture decoding process, and the data is used for decoding one or more slices in the picture. The picture-layer unit includes one or more of the following data units in the video bitstream: a Network Abstraction Layer (NAL) unit header;

a parameter set; a sequence header; a picture header; a slice header; and an auxiliary information unit of the video bitstream (for example, Supplemental Enhancement Information (SEI) and Video Usability Information (VUI)).

The first parameter is used for indicating a reference coordinate position of the picture. A method for arranging the first parameter in the bitstream is shown in Table 1.

TABLE 1

Method for Arranging First Parameter in Bitstream

| | Descriptor |
|---|---|
| ... ... | |
| pic_slice_address_info_present_flag | u(1) |
| if(slice_address_info_present_flag){ | |
|     pic_slice_address_info_x0 | ue(v) |
|     pic_slice_address_info_y0 | ue(v) |
|     pic_slice_address_info_stride_width | ue(v) |
|     pic_slice_address_info_stride_height | ue(v) |
| } | |
| ... ... | |
| } | |

Each syntax unit in Table 1 has the following semantics.

If a value of pic_slice_address_info_present_flag is 1, it represents that a parameter used for determining an address of a slice in the picture is contained in the bitstream. If the value of pic_slice_address_info_present_flag is 0, it represents that the parameter used for determining the address of the slice in the picture is not contained in the bitstream. If the value of pic_slice_address_info_present_flag is 0, values of pic_slice_address_info_x0 and pic_slice_address_info_y0 are 0, a value of pic_slice_address_info_stride_width is equal to a width of the picture, and a value of pic_slice_address_info_stride_height is equal to a height of the picture.

In the process of parsing the bitstream, the value of pic_slice_address_info_present_flag is obtained by an entropy decoding method corresponding to u(1).

In the above, pic_slice_address_info_x0, pic_slice_address_info_y0, pic_slice_address_info_stride_width and pic_slice_address_info_stride_height are used for calculating the address of the slice in the picture.

Optionally, the first parameter may not include pic_slice_address_info_stride_height, i.e., pic_slice_address_info_stride_height may not be contained in the bitstream.

In the process of parsing the bitstream, the values of the four parameters are obtained by an entropy decoding method corresponding to ue(v). It is to be noted that, in bitstream arrangement, descriptors of the four parameters may also use u(v). Under the condition that u(v) is used, bit numbers of the four parameters in the bitstream are as follows: the bit numbers corresponding to pic_slice_address_info_x0 and pic_slice_address_info_stride_width are equal to Ceil(Log 2(PicWidth)), and the bit numbers corresponding to pic_slice_address_info_y0 and pic_slice_address_info_stride_height are equal to Ceil(Log 2(PicHeight)). PicWidth is the width of the picture, and PicHeight is the height of the picture. Mathematical functions Ceil(x) and Log 2(x) are the same as mathematical functions with the same names defined in the H.265/HEVC standard.

It is to be noted that, in Table 1, a manner of setting pic_slice_address_info_x0 and pic_slice_address_info_y0 in the bitstream respectively is adopted. Under the condition that the width of the picture and the height of the picture are known, sequential numbers of pixels represented by pic_slice_address_info_x0 and pic_slice_address_info_y0 may also be adopted to represent in the picture may also be adopted to represent the two parameters in the bitstream. The serial number of the pixel may be a serial number of a block where the pixel is located in the picture. The undermentioned representation method for second parameters slice_address_x and slice_address_y in the slice header information in the bitstream is similar to this representation method for the first parameters.

It is to be noted that, in the implementation mode, counting units of pic_slice_address_info_x0, pic_slice_address_info_y0, pic_slice_address_info_stride_width and pic_slice_address_info_stride_height in Table 1 are sample (sample point). Under the condition that a size of a block division unit in the picture is known, the size of the block division unit may also be used as the counting unit. The undermentioned representation method for second parameters slice_address_x and slice_address_y in the slice header information in the bitstream is similar. In the implementation mode of the patent, the adopted counting unit is sample (sample point).

The bitstream may exist in one or more picture-layer units. For example, in case of existence in multiple parameter sets, according to a reference relationship between the parameter sets, a parameter in one parameter set may cover a corresponding parameter in one or more other parameter sets that the parameter set directly or indirectly refers to. The parameter in the slice header information may cover a corresponding parameter in one or more parameter sets that the slice directly or indirectly refers to. When one or some parameter sets are not in any direct or indirect reference relationship with the other parameter sets, parameters in the other parameter sets may be covered by parameters in the specified parameter sets according to a preset coverage manner, or a parameter to be adopted is determined according to one or both of identification information in the parameter set and identification information in the slice header information. In addition, optionally, under the condition that the first parameter may be obtained from one or more picture-layer units, the finally adopted first parameter may further be determined in the decoding process according to a flag bit in the bitstream or the identification information.

In operation 202, slice header information is parsed to obtain a second parameter of a starting position of a slice in the picture.

The second parameter is used for indicating a coordinate position of the slice. A method for arranging the second parameter in the bitstream is shown in Table 2. A bitstream corresponding to the second parameter is in a bitstream corresponding to a slice header information unit.

TABLE 2

Method for Arranging Second Parameter in Bitstream

| | Descriptor |
|---|---|
| ... ... | |
| slice_address_x | ue(v) |
| slice_address_y | ue(v) |
| ... ... | |
| } | |

Each syntax unit in Table 2 has the following semantics:

slice_address_x and slice_address_y are used for calculating an address of the slice in the picture.

In the process of parsing the bitstream, the values of the two parameters are obtained by the entropy decoding method corresponding to ue(v). It is to be noted that, in bitstream organization, descriptors of the two parameters may also use u(v). Under the condition that u(v) is used, bit numbers of the two parameters in the bitstream are as follows: the bit number corresponding to slice_address_x is equal to Ceil(Log 2(PicWidth)), and the bit number corresponding to slice_address_y is Ceil(Log 2(PicHeight)). PicWidth is the width of the picture, and PicHeight is the height of the picture. The mathematical functions Ceil(x) and Log 2(x) are the same as the mathematical functions with the same names defined in the H.265/HEVC standard.

In operation 203, a starting position coordinate parameter of the slice in the picture is calculated according to the first parameter and the second parameter.

Herein, under the condition that sample (sample point) is taken as the counting units of the first parameter and the second parameter, a coordinate (SliceAddrX, SliceAddrY) of a left upper sample (i.e., a first sample in the slice) of a first decoding block in the slice in the picture is calculated by use of the following equations (Eqs.) 1 and 2:

$$\text{SliceAddrX} = (\text{slice\_address\_x} - \text{pic\_slice\_address\_info\_x0} + \text{pic\_slice\_address\_info\_stride\_width}) \% \text{pic\_slice\_address\_info\_stride\_width} \quad (\text{Eq. 1}), \text{ and}$$

$$\text{SliceAddrY} = (\text{slice\_address\_y} - \text{pic\_slice\_address\_info\_y0} + \text{pic\_slice\_address\_info\_stride\_height}) \% \text{pic\_slice\_address\_info\_stride\_height} \quad (\text{Eq. 2}).$$

In at least one exemplary embodiment, when the first parameter does not include pic_slice_address_info_stride_height and pic_slice_address_info_stride_height is not contained in the bitstream, a calculation method for SliceAddrY is as follows in Eq. 3:

$$\text{SliceAddrY} = \text{slice\_address\_y} - \text{pic\_slice\_address\_info\_y0} \quad (\text{Eq. 3}).$$

Implementation Mode 2

Figure 6:
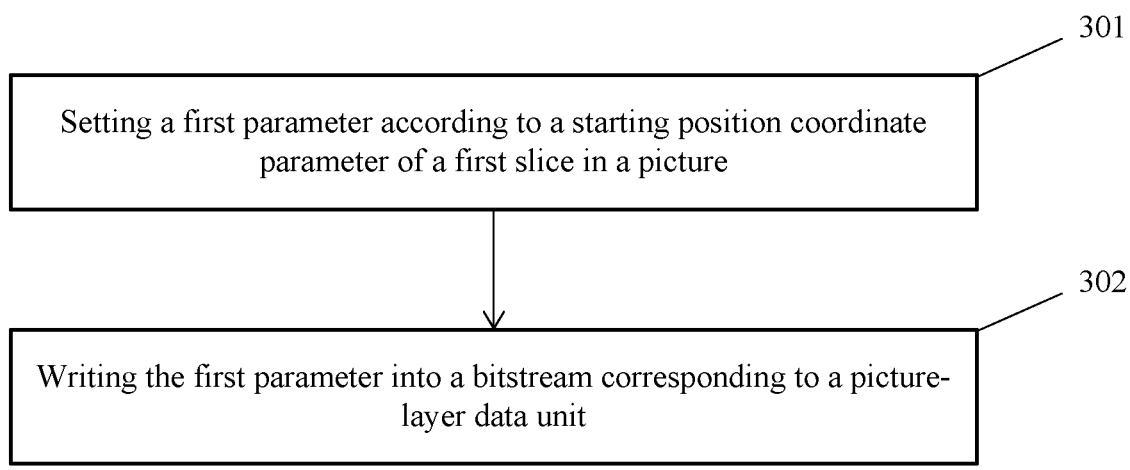
FIG. 6 is a schematic diagram of a bitstream generation method according to an implementation mode.

FIG. 6 is a schematic diagram of a bitstream generation method according to the implementation mode, as shown in FIG. 6, by use of a method of the implementation mode, a bitstream is generated mainly through the following operations.

In operation 301, a first parameter is set according to a starting position coordinate parameter of a first slice in a picture.

In operation 302, the first parameter is written into a bitstream corresponding to a picture-layer data unit.

In the bitstream generation method of the implementation mode, the corresponding parameter is written into the bitstream by use of the structure for arranging the first parameter in the bitstream as shown in Table 1.

The bitstream generated by the bitstream generation method of implementation mode 2 may be decoded by the decoding method of implementation mode 1.

The bitstream generation method in the implementation mode may further be subdivided into two conditions: a video picture is coded to generate a bitstream, and bitstream extraction is performed on an existing bitstream to generate a sub bitstream. Operations for bitstream generation under the two conditions will be described in the following implementation modes respectively.

Implementation Mode 3

Figure 7:
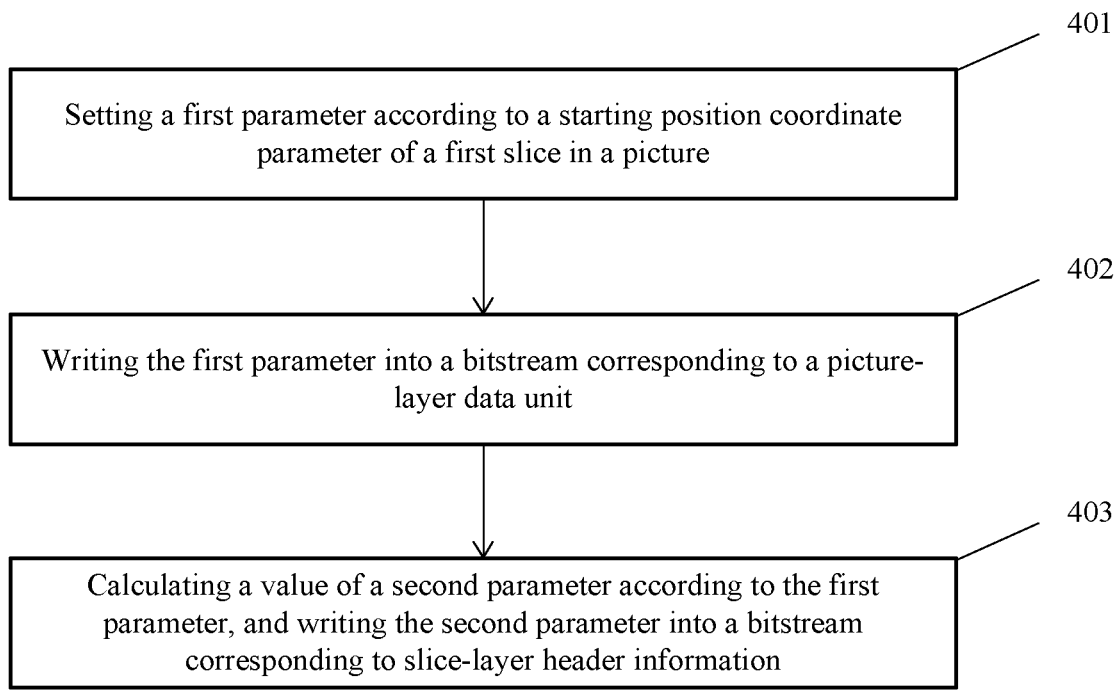
FIG. 7 is a schematic diagram of a method for coding a video picture to generate a bitstream according to an implementation mode.

FIG. 7 is a schematic diagram of a method for coding a video picture to generate a bitstream according to an implementation mode.

In the method of the implementation mode, the structure for arranging the first parameter in the bitstream as shown in Table 1 is used, and the first parameter is coded in a parameter set. In the method of the implementation mode, the structure for arranging the second parameter in the bitstream as shown in Table 2 is used, and the second parameter is coded in slice header information. A bitstream generated by the bitstream generation method of implementation mode 3 may be decoded by the decoding method of implementation mode 1.

In operation 401, a first parameter is set according to a starting position coordinate parameter of a first slice in a picture.

(pic_slice_address_info_x0, pic_slice_address_info_y0) is set as a coordinate of a left upper sample (sample point) of a first coding block in the first slice in the picture in the picture. Under a normal condition, the left upper sample (sample point) of the first coding block in the first slice in the picture is a left upper sample (sample point) of the picture, and values of (pic_slice_address_info_x0, pic_slice_address_info_y0) may be set to be (0, 0).

A value of pic_slice_address_info_stride_width is set to be a value of a width of the picture.

A value of pic_slice_address_info_stride_height is set to be a value of a height of the picture.

In operation 402, the first parameter is written into a bitstream corresponding to a picture-layer data unit.

Optionally, for a value of pic_slice_address_info_present_flag, when the values of (pic_slice_address_info_x0, pic_slice_address_info_y0) are (0, 0) and the values of pic_slice_address_info_stride_width and pic_slice_address_info_stride_height are equal to the width and height of the picture respectively, namely values of four syntax elements related to the first parameter are equal to default values when the value of pic_slice_address_info_present_flag is 0, the value of pic_slice_address_info_present_flag may be set to be 0.

Optionally, for the value of pic_slice_address_info_present_flag, the value of pic_slice_address_info_present_flag may be set to be 1, and the values of the four syntax elements related to the first parameter are coded in the bitstream.

The value of pic_slice_address_info_present_flag and the values (when the value of pic_slice_address_info_present_flag is 1) of the four syntax elements related to the first parameter are written into one or more data units in the bitstream by use of an entropy coding method corresponding to a descriptor of each syntax unit in Table 1.

Herein, the data unit in the bitstream may be one or more of a VPS, an SPS, a PPS and one or more other parameter sets (for example, an Adaptive Parameter Set (APS)) available for one or more slices in the picture. When the first parameter is written into multiple parameter sets, the bitstream generation method of the implementation mode is required to ensure that a correct first parameter can be obtained in a decoding process by use of the decoding method of implementation mode 1. The correct first parameter refers to a first parameter used by the bitstream generation method in a bitstream generation process.

In operation 403, a value of a second parameter is calculated according to the first parameter, and the second parameter is written into a bitstream corresponding to slice header information.

A coordinate (SliceAddrX, SliceAddrY) of a left upper sample (sample point) of a first coding block of a slice in the picture is determined.

In the bitstream generation process, a value of slice_address_x is set to be a numerical value that can be calculated according to formula (1) in implementation mode 1 and is equal to a value of SliceAddrX. For example, when the values of (pic_slice_address_info_x0, pic_slice_address_info_y0) are (0, 0), the value of slice_address_x is set to be equal to the value of SliceAddrX.

In the bitstream generation process, a value of slice_address_y is set to be a numerical value that can be calculated according to formula (2) in implementation mode 1 and is equal to a value of SliceAddrY. For example, when the values of (pic_slice_address_info_x0, pic_slice_address_info_y0) are (0, 0), the value of slice_address_y is set to be equal to the value of SliceAddrY.

The values of the syntax elements slice_address_x and slice_address_y related to the second parameter are written into the bitstream corresponding to the slice header information by use of an entropy coding method corresponding to a descriptor of each syntax unit in Table 2.

Implementation Mode 4

Figure 8:
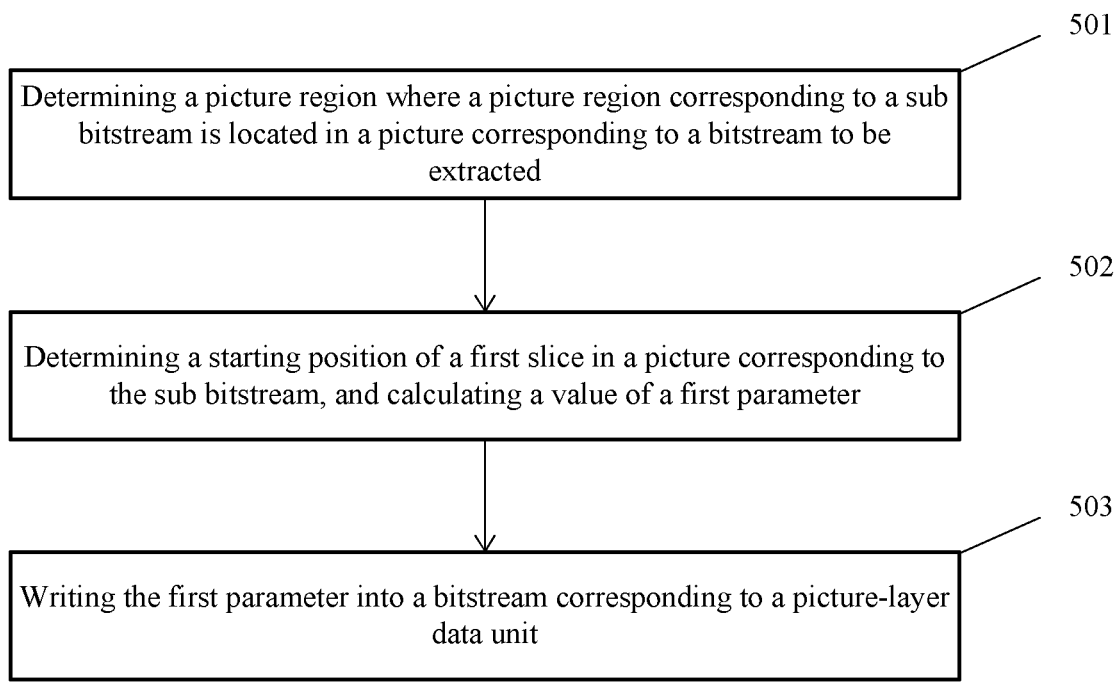
FIG. 8 is a schematic diagram of a method for extracting a video bitstream to generate a bitstream according to an implementation mode.

FIG. 8 is a schematic diagram of a method for extracting a video bitstream to generate a bitstream according to an implementation mode.

In the implementation mode, an input bitstream of a bitstream extraction process is called a "bitstream to be extracted" or an "original bitstream", and an output bitstream of the bitstream extraction process is called a "sub bitstream". "A picture corresponding to the bitstream to be extracted" (or "a picture corresponding to the original bitstream") refers to a restored picture obtained by decoding the bitstream to be extracted (or the original bitstream), and "a picture corresponding to the sub bitstream" refers to a restored picture obtained by decoding the sub bitstream. The "bitstream to be extracted" (or the "original bitstream" may be a bitstream obtained by coding a video picture through the method of implementation mode 3 and may also be a sub bitstream obtained by performing bitstream extraction through the methods of implementation mode 4 and implementation mode 5.

In the method of the implementation mode, the structure for arranging the first parameter in the bitstream as shown in Table 1 is used, and the first parameter is recoded (or called "overwritten") in a parameter set of the sub bitstream in the extraction process. In the method of the implementation mode, the structure for arranging the second parameter in the bitstream as shown in Table 2 is used, and the second parameter in slice header information in the bitstream to be extracted is not required to be overwritten in the extraction process, so that the complexity of recalculating a starting position for a slice in the sub bitstream and coding the starting position in the bitstream extraction process is reduced, and the efficiency of the bitstream extraction process is improved.

A bitstream generated by the bitstream generation method of the implementation mode may be decoded by the decoding method of implementation mode 1.

Figure 9:
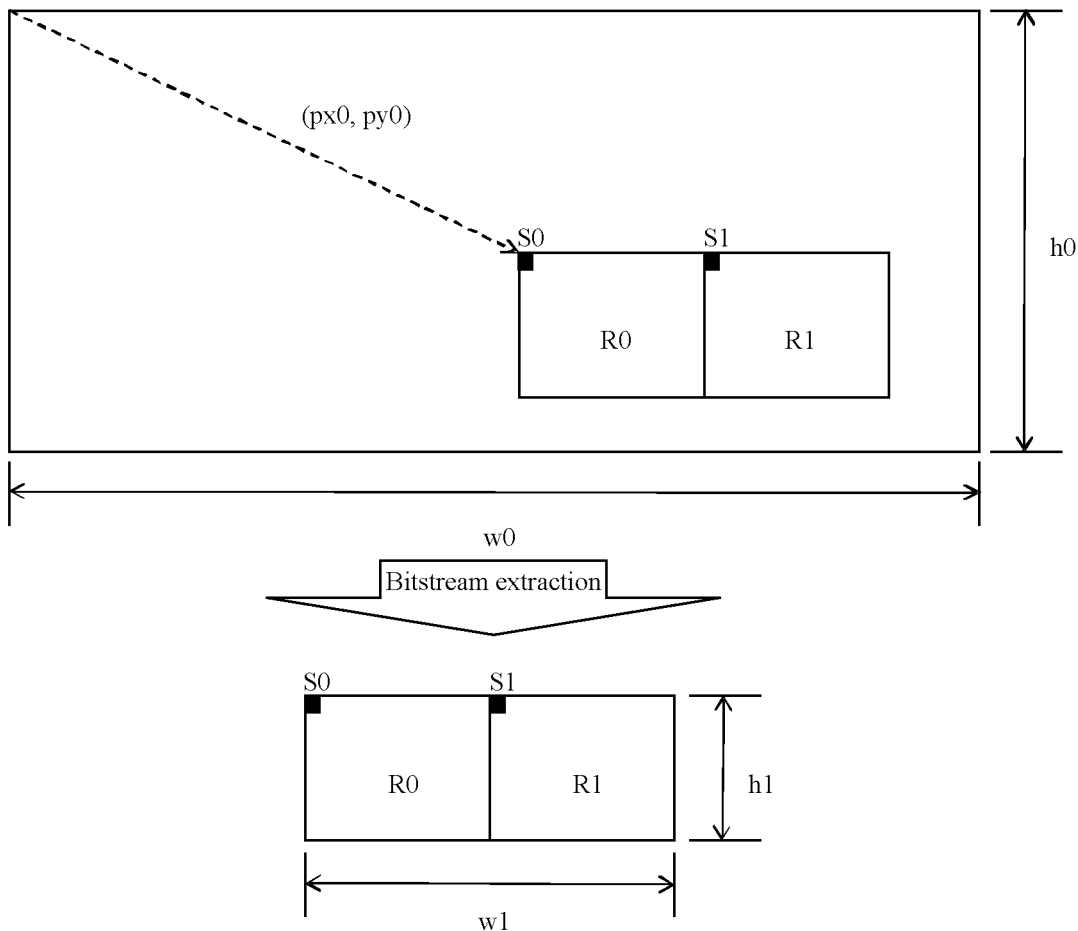
FIG. 9 is an example diagram of a bitstream extraction implementation process according to an implementation mode.

FIG. 9 is an example diagram of a bitstream extraction implementation process according to an implementation mode. In FIG. 9, a picture corresponding to a bitstream to be extracted is a picture with a width of w0 and a height of h0, and two picture regions R0 and R1 form a picture (with a width of w1 and a height of h1) corresponding to a sub bitstream. A left upper pixel of a first coding block (or decoding block) in a first slice in the region R0 is S0, and a left upper pixel of a first coding block (or decoding block) in a first slice in the region R1 is S1. A coordinate of S0 in the picture corresponding to the bitstream to be extracted is (px0, py0), and a coordinate value of S0 may be obtained by the method for calculating (SliceAddrX, SliceAddrY) in implementation mode 1 according to a first parameter in the bitstream to be extracted and a second parameter. It is to be noted that the implementation mode is also applicable to the condition that the picture corresponding to the sub bitstream includes only the region R0 or more regions besides R0 and R1.

In the implementation mode, descriptions are made taking the condition that the first parameter is only contained in a PPS in the bitstream to be extracted as an example. For the condition that the first parameter is contained in multiple parameter sets, a method for determining the first parameter is the same as the implementation mode, and a method for recoding the first parameter in the sub bitstream is the same as the method for coding the first parameter in multiple parameter sets in implementation mode 3.

In operation 501, a picture region where a picture region corresponding to a sub bitstream is located in a picture corresponding to a bitstream to be extracted is determined.

In the example shown in FIG. 9, the picture regions corresponding to the sub bitstream are R0 and R1, and the position coordinate of the sample (sample point) S0 in R0 in the bitstream to be extracted is (px0, py0). After extraction, a picture corresponding to the sub bitstream is a picture formed according to a manner that "R0 is on the left and R1 is on the right" in FIG. 9 and having the width of w1 and the height of h1.

For the condition of a motion-constrained slice group set using the H.264/AVC standard, in the bitstream extraction process, the picture region where the picture region corresponding to the sub bitstream is located in the picture corresponding to the bitstream to be extracted may be determined according to auxiliary information related to the motion-constrained slice group set in the bitstream and a viewing requirement of a user. For example, for the example shown in FIG. 9, R0 and R1 correspond to one or more motion-constrained slice group sets available for bitstream extraction respectively.

For the condition of temporal Motion-Constrained Tile Sets (MCTSs) using the H.265/HEVC standard, in the bitstream extraction process, the picture region where the picture region corresponding to the sub bitstream is located in the picture corresponding to the bitstream to be extracted may be determined according to auxiliary information related to an MCTS in the bitstream and the viewing requirement of the user. For example, for the example shown in FIG. 9, R0 and R1 correspond to one or more MCTSs available for bitstream extraction respectively.

In operation 502, a starting position of a first slice in a picture corresponding to the sub bitstream is determined, and a value of a first parameter is calculated.

In the example shown in FIG. 9, the value of the first parameter of the sub bitstream is determined by the following method:

a value of pic_slice_address_info_x0 is set to be a value of px0;

a value of pic_slice_address_info_y0 is set to be a value of py0;

a value of pic_slice_address_info_stride_width is kept unchanged (namely equal to a value of pic_slice_address_info_stride_width in the bitstream to be extracted); and a value of pic_slice_address_info_stride_height is kept unchanged (namely equal to a value of pic_slice_address_info_stride_height in the bitstream to be extracted).

In operation 503, the first parameter is written into a bitstream corresponding to a picture-layer data unit.

In the implementation mode, bitstream extraction is performed on the bitstream to be extracted by an existing method to obtain the sub bitstream. In the bitstream extraction process, a syntax unit corresponding to the first parameter in a PPS applied to the sub bitstream is recoded.

The first parameter is written into the bitstream corresponding to the PPS of the sub bitstream by the method of operation 402 in implementation mode 3.

In the process of performing bitstream extraction on the example shown in FIG. 8 by the method of the implementation mode, a slice bitstream in the sub bitstream is directly from the bitstream to be extracted, and information in the slice bitstream is not required to be recoded in the bitstream extraction process. In addition, when the sub bitstream obtained by extraction is re-extracted, it is only necessary to process the sub bitstream as a "bitstream to be extracted" by the method of the implementation mode, and only the first parameter in the PPS is required to be recoded in the extraction process. Regardless of an extraction manner, both the bitstream to be extracted and the sub bitstream may be decoded by the decoding method of implementation mode 1. It is apparent that, through the method of implementation mode 5, the bitstream extraction processing efficiency may be greatly improved.

Implementation Mode 5

In the implementation mode, bitstream extraction performed on an example shown in c0 by the method of implementation mode 4 is described.

Figure 10:
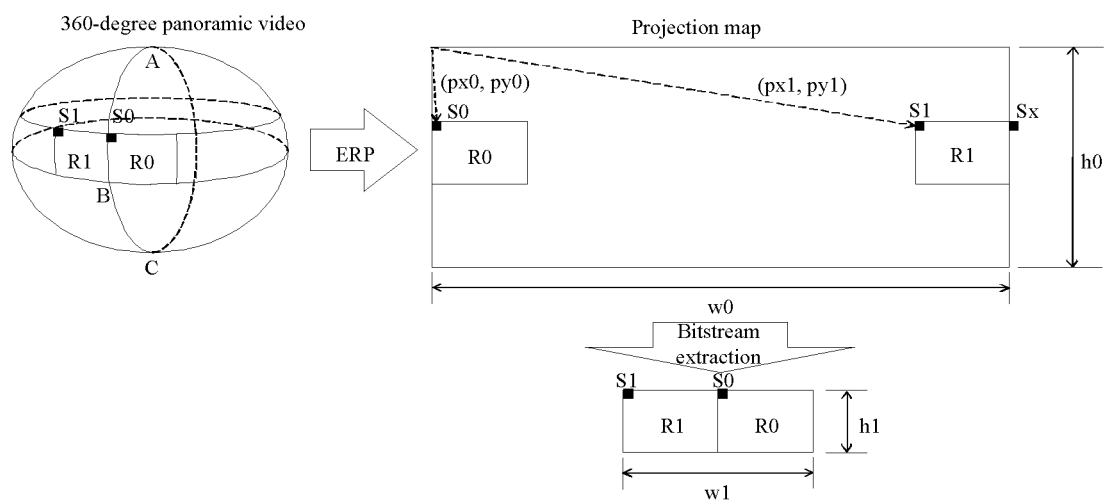
FIG. 10 is a schematic diagram showing the application of the solution of the embodiments in a 360-degree panoramic video.

FIG. 10 is a schematic diagram showing the application of the solution of the embodiments in a 360-degree panoramic video. Herein, the 360-degree panoramic video is a spherical video, and a viewer is in the center of sphere. In FIG. 10, a viewing region selected by the viewer is regions R1 and R0.

In the implementation mode, a bitstream to be extracted is generated by an existing 360-degree panoramic video coding method. According to this coding method, the spherical video is converted into an ordinary two-dimensional video, and then the two-dimensional video is coded by a video coder. At a receiver, the two-dimensional video is decoded by a video decoder, and is reconverted to the spherical video so that a terminal can provide the spherical video to a user.

During a practical application, the user views a certain region in the 360-degree panoramic video. Therefore, for saving a transmission bandwidth, the region viewed by the user may be determined according to a viewing angle of the user, a sub bitstream corresponding to the region viewed by the user is extracted from the bitstream to be extracted, and the sub bitstream is sent to the receiver. The receiver decodes the sub bitstream, reconverts a picture obtained by decoding the sub bitstream to a picture corresponding to the viewed region in the spherical video according to auxiliary information (which may be auxiliary information contained in the video bitstream and may also be auxiliary information contained in a system layer) and provides the picture to the user.

In the example shown in FIG. 10, the 360-degree panoramic video, i.e., the spherical video, is converted into an ordinary two-dimensional picture with a width of w0 and a height of h0 according to an Equirectangular Projection (ERP) manner. In the two-dimensional picture obtained by conversion, the region R0 and the region R1 are at a left picture boundary and right picture boundary of the two-dimensional picture respectively. A left upper pixel of a first coding block (or decoding block) in a first slice in the region R0 is S0, and a left upper pixel of a first coding block (or decoding block) in a first slice in the region R1 is S1. A coordinate of S0 in the two-dimensional picture is (px0, py0), and a coordinate of S1 in the two-dimensional picture is (px1, py1). Coordinate value of S0 and S1 may be obtained by the method for calculating (SliceAddrX, SliceAddrY) in implementation mode 1 according to a first parameter in the bitstream to be extracted and second parameters in the corresponding slices.

In the 360-degree panoramic video shown in FIG. 10, the region viewed by the viewer is the region R1 and region R0 on the sphere. Therefore, the picture corresponding to the sub bitstream is formed in the manner that "R0 is on the left and R1 is on the right".

Implementation Mode 6

The embodiment is adopted to describe a method for extracting a bitstream to generate a bitstream in the example shown in FIG. 10. The following operations are included.

In operation 601, a picture region where a picture region corresponding to a sub bitstream is located in a picture corresponding to a bitstream to be extracted is determined.

In the example shown in FIG. 10, after extraction, a picture corresponding to the sub bitstream is a picture formed in a manner that "R0 is on the left and R1 is on the right" and having a width of w1 and a height of h1.

In operation 602, a starting position of a first slice in a picture corresponding to the sub bitstream is determined, and a value of a first parameter is calculated.

In the example shown in FIG. 10, in an ERP with a width of w0 and the height of h1, a starting position of the region R0 is equivalently required to be changed from S0 to Sx. In a 360-degree panoramic video, S0 and Sx correspond to the same sample (sample point) on the sphere. According to the method for calculating a starting position of a slice in operation 203 in implementation mode 1, a value of the first parameter of the sub bitstream is required to be determined as follows:

a value of pic_slice_address_info_x0 is set to be a value of px1;

a value of pic_slice_address_info_y0 is set to be a value of py1;

a value of pic_slice_address_info_stride_width is kept unchanged (namely equal to a value of pic_slice_address_info_stride_width in the bitstream to be extracted); and a value of pic_slice_address_info_stride_height is kept unchanged (namely equal to a value of pic_slice_address_info_stride_height in the bitstream to be extracted).

In operation 603, the first parameter is written into a bitstream corresponding to a picture-layer data unit.

In the implementation mode, bitstream extraction is performed on the bitstream to be extracted by an existing method to obtain the sub bitstream. In the bitstream extraction process, a syntax unit corresponding to the first parameter in a PPS applied to the sub bitstream is recoded.

The first parameter is written into the bitstream corresponding to the PPS of the sub bitstream by the method of operation 402 in implementation mode 3.

In the process of performing bitstream extraction on the example shown in FIG. 9 by the method of the implementation mode, a slice bitstream in the sub bitstream is directly from the bitstream to be extracted, and information in the slice bitstream is not required to be recoded in the bitstream extraction process. In addition, when the sub bitstream obtained by extraction is re-extracted, it is only necessary to process the sub bitstream as a "bitstream to be extracted" by the method of the implementation mode, and only the first parameter in the PPS is required to be recoded in the extraction process. Regardless of an extraction manner, both the bitstream to be extracted and the sub bitstream may be decoded by the decoding method of implementation mode 1. It is apparent that, through the method of implementation mode 6, the bitstream extraction processing efficiency may be greatly improved.

Implementation Mode 7

The implementation mode provides an implementation mode of an electronic system, which includes one or more undermentioned electronic devices, configured to process or generate a media bitstream or media file including a video bitstream.

The electronic device decodes the video bitstream by the method of implementation mode 1 or performs bitstream extraction by the methods of implementation mode 4 and implementation mode 1.

The electronic device may perform sub bitstream extraction on the media bitstream or media file using the H.265/HEVC standard by the method of implementation mode 2 or perform sub bitstream extraction by the methods of implementation mode 4 and implementation mode 2.

The electronic device may perform sub bitstream extraction on the media bitstream or media file using the H.264/AVC standard by the method of implementation mode 3, or perform sub bitstream extraction by the methods of implementation mode 4 and implementation mode 3.

The electronic device of the implementation mode may be a related apparatus for generating a bitstream and a receiving and playing apparatus in a video communication application, for example, a mobile phone, a computer, a server, a set-top box, a portable mobile terminal, a digital camera, a television broadcast system device, a content delivery network device and a media server.

Embodiment 4

The embodiment of the present disclosure also provides a storage medium, in which a computer program is stored, the computer program being configured to execute, when running, the operations in any abovementioned method embodiment.

In the embodiment, the storage medium may be configured to store a computer program configured to execute the following operations.

In S1, a first parameter of a reference position of a slice in a picture is acquired.

In S2, a second parameter of the slice is acquired, the second parameter being used for determining a starting position of the slice in the video picture.

In S3, a starting position coordinate parameter of the slice in the video picture is calculated according to the first parameter and the second parameter.

In the embodiment, the storage medium may include, but not limited to, various medium capable of storing computer programs such as a U disk, a ROM, a RAM, a mobile hard disk, a magnetic disk or an optical disk.

The embodiment of the present disclosure also provides an electronic device, which includes a memory and a processor. A computer program is stored in the memory. The processor is configured to run the computer program to execute the operations in any abovementioned method embodiment.

In at least one exemplary embodiment, the electronic device may further include a transmission device and an input/output device. The transmission device is connected with the processor, and the input/output device is connected with the processor.

In the embodiment, the processor in the embodiment may be configured to execute the following operations through the computer program.

In S1, a first parameter of a reference position of a slice in a picture is acquired.

In S2, a second parameter of the slice is acquired, the second parameter being used for determining a starting position of the slice in the video picture.

In S3, a starting position coordinate parameter of the slice in the video picture is calculated according to the first parameter and the second parameter.

Optionally, examples in the embodiment may refer to the examples described in the abovementioned embodiments and optional implementation modes and will not be elaborated in the embodiment.

It is apparent that those skilled in the art should know that each module or each step of the present disclosure may be implemented through a universal computing device. They may be concentrated in a single computing device or distributed in a network formed by multiple computing devices. In at least one exemplary embodiment, they may be implemented by program codes executable for the computing devices and thus may be stored in a storage device for execution with the computing devices. Moreover, in some cases, the shown or described operations may be executed in sequences different from those described here, or may form various integrated circuit modules respectively, or multiple modules or operations therein may form a single integrated circuit module for implementation. Therefore, the present disclosure is not limited to any specific hardware and software combination.

The above is only the exemplary embodiment of the present disclosure and not intended to limit the present disclosure. For those skilled in the art, the present disclosure may have various modifications and variations. Any modifications, equivalent replacements, improvements and the like made within the principle of the present disclosure shall fall within the scope of protection of the present disclosure.

What is claimed is:

1. A method for decoding a video bitstream, comprising:
acquiring a first parameter of a reference position of a slice in a video picture;
acquiring a second parameter of the slice, the second parameter being used for determining a starting position of the slice in the video picture; and
calculating a starting position coordinate parameter of the slice in the video picture according to the first parameter and the second parameter;
wherein the first parameter comprises coordinate information of the video picture and stride information of the video picture, and the second parameter comprises coordinate information of the slice;
wherein the coordinate information of the video picture comprises a coordinate of the reference position of the slice in the video picture in a horizontal direction and a coordinate of the reference position of the slice in the video picture in a vertical direction; the stride information of the video picture comprises a stride value of the video picture in a horizontal direction and a stride value of the video picture in a vertical direction, or the stride information of the video picture comprises a stride value of the video picture in a horizontal direction; the coordinate information of the slice comprises a position coordinate of the slice in a horizontal direction and a position coordinate of the slice in a vertical direction.

2. The method as claimed in claim 1, wherein acquiring the first parameter of the reference position of the slice in the video picture comprises:
parsing one or more first bitstreams corresponding to a picture-layer data unit in the video bitstream; and acquiring the first parameter from the one or more first bitstreams.

3. The method as claimed in claim 2, wherein, based on there being multiple first bitstreams, acquiring the first parameter from the multiple first bitstreams comprises:
   parsing the multiple first bitstreams to obtain multiple first parameters;
   acquiring at least one of identification information related to the picture-layer data unit, and a reference relationship between multiple picture-layer data units; and
   determining one first parameter among the multiple first parameters according to the at least one of the identification information and the reference relationship.

4. The method as claimed in claim 3, wherein the identification information related to the picture-layer data unit is used for indicating the first parameter used for calculating the starting position coordinate parameter of the slice in the video picture.

5. The method as claimed in claim 3, wherein the picture-layer data unit comprises at least one of: a Video Parameter Set (VPS), a Sequence Parameter Set (SPS), a Picture Parameter Set (PPS), a sequence header, a picture header, a slice header, and a picture-layer auxiliary information unit.

6. The method as claimed in claim 1, wherein acquiring the second parameter of the slice comprises:
   parsing slice-layer header information of the video bitstream; and
   acquiring the second parameter from the slice-layer header information.

7. The method as claimed in claim 1, wherein calculating the starting position coordinate parameter of the slice in the video picture according to the first parameter and the second parameter comprises:
   calculating the starting position coordinate parameter (SliceAddrX, SliceAddrY) according to:

SliceAddrX=(slice_address_x−pic_slice_address_info_x0+pic_slice_address_info_stride_width) % pic_slice_address_info_stride_width; and SliceAddrY=(slice_address_y−pic_slice_address_info_y0+pic_slice_address_info_stride_height) % pic_slice_address_info_stride_height;

wherein SliceAddrX is a starting position coordinate of the slice in the video picture in a horizontal direction, SliceAddrY is a starting position coordinate of the slice in the video picture in a vertical direction, slice_address_x is a position coordinate of the slice in the horizontal direction, slice_address_y is a position coordinate of the slice in the vertical direction, pic_slice_address_info_x0 is a coordinate of the reference position of the slice in the video picture in the horizontal direction, pic_slice_address_info_y0 is a coordinate of the reference position of the slice in the video picture in the vertical direction, pic_slice_address_info_stride_width is a stride value of the video picture in the horizontal direction, and pic_slice_address_info_stride_height is a stride value of the video picture in the vertical direction.

8. The method as claimed in claim 1, wherein calculating the starting position coordinate parameter of the slice in the video picture according to the first parameter and the second parameter comprises:
   calculating the starting position coordinate parameter (SliceAddrX, SliceAddrY) according to:

SliceAddrX(slice_address_x−pic_slice_address_info_x0+pic_slice_address_info_stride_width) % pic_slice_address_info_stride_width; and SliceAddrY(slice_address_y−pic_slice_address_info_y0;

wherein SliceAddrX is a starting position coordinate of the slice in the video picture in a horizontal direction, SliceAddrY is a starting position coordinate of the slice in the video picture in a vertical direction, slice_address_x is a position coordinate of the slice in the horizontal direction, slice_address_y is a position coordinate of the slice in the vertical direction, pic_slice_address_info_x0 is a coordinate of the reference position of the slice in the video picture in the horizontal direction, pic_slice_address_info_y0 is a coordinate of the reference position of the slice in the video picture in the vertical direction, and
   pic_slice_address_info_stride_width is a stride value of the video picture in the horizontal direction.

9. A method for generating a video bitstream, comprising:
   setting a first parameter according to a starting position of a first slice in a video picture; and
   writing the first parameter into a bitstream of a picture-layer data unit of the video picture;
   calculating a second parameter according to a starting position coordinate parameter of a slice in the video picture and the first parameter, and writing the second parameter into a bitstream corresponding to slice-layer header information, the second parameter being used for determining a starting position of the slice in the video picture;
   wherein the first parameter comprises coordinate information of the video picture and stride information of the video picture, and the second parameter comprises coordinate information of the slice;
   wherein the coordinate information of the video picture comprises a coordinate of the reference position of the slice in the video picture in a horizontal direction and a coordinate of the reference position of the slice in the video picture in a vertical direction; the stride information of the video picture comprises a stride value of the video picture in a horizontal direction and a stride value of the video picture in a vertical direction, or the stride information of the video picture comprises a stride value of the video picture in a horizontal direction; the coordinate information of the slice comprises a position coordinate of the slice in a horizontal direction and a position coordinate of the slice in a vertical direction.

10. The method as claimed in claim 9, wherein setting the first parameter according to the starting position of the first slice in the video picture comprises:
    determining a picture region where a picture corresponding to a sub bitstream is located in a picture corresponding to a bitstream to be extracted, the picture corresponding to the sub bitstream being the video picture; and
    determining the starting position of the first slice in the video picture, and calculating the first parameter according to the starting position, the starting position of the first slice being a starting position coordinate of the first slice in the video picture in the picture corresponding to the bitstream to be extracted.

11. An apparatus for decoding a video bitstream, comprising:
    a first acquisition module, configured to acquire a first parameter of a reference position of a slice in a video picture;

a second acquisition module, configured to acquire a second parameter of the slice, the second parameter being used for determining a starting position of the slice in the video picture; and a calculation module, configured to calculate a starting position coordinate parameter of the slice in the video picture according to the first parameter and the second parameter;

wherein the first parameter comprises coordinate information of the video picture and stride information of the video picture, and the second parameter comprises coordinate information of the slice;

wherein the coordinate information of the video picture comprises a coordinate of the reference position of the slice in the video picture in a horizontal direction and a coordinate of the reference position of the slice in the video picture in a vertical direction; the stride information of the video picture comprises a stride value of the video picture in a horizontal direction and a stride value of the video picture in a vertical direction, or the stride information of the video picture comprises a stride value of the video picture in a horizontal direction; the coordinate information of the slice comprises a position coordinate of the slice in a horizontal direction and a position coordinate of the slice in a vertical direction.

12. An apparatus for generating a video bitstream, comprising:

a setting module, configured to set a first parameter according to a starting position of a first slice in a video picture; and a generation module, configured to write the first parameter into a bitstream of a picture-layer data unit of the video picture;

wherein the apparatus is further configured to, after the generation module writes the first parameter into the bitstream of the picture-layer data unit of the video picture, calculate a second parameter according to a starting position coordinate parameter of a slice in the video picture and the first parameter, and write the second parameter into a bitstream corresponding to slice-layer header information, the second parameter being used for determining a starting position of the slice in the video picture;

wherein the first parameter comprises coordinate information of the video picture and stride information of the video picture, and the second parameter comprises coordinate information of the slice;

wherein the coordinate information of the video picture comprises a coordinate of the reference position of the slice in the video picture in a horizontal direction and a coordinate of the reference position of the slice in the video picture in a vertical direction; the stride information of the video picture comprises a stride value of the video picture in a horizontal direction and a stride value of the video picture in a vertical direction, or the stride information of the video picture comprises a stride value of the video picture in a horizontal direction; the coordinate information of the slice comprises a position coordinate of the slice in a horizontal direction and a position coordinate of the slice in a vertical direction.

13. A non-transitory storage medium, in which a computer program is stored, the computer program being configured to execute, when running, the methods as claimed in claim 1.

14. An electronic device, comprising a memory and a processor, wherein a computer program is stored in the memory; and the processor is configured to run the computer program to execute the method as claimed in claim 1.

15. A non-transitory storage medium, in which a computer program is stored, the computer program being configured to execute, when running, the methods as claimed in claim 9.

16. An electronic device, comprising a memory and a processor, wherein a computer program is stored in the memory; and the processor is configured to run the computer program to execute the method as claimed in claim 9.

17. An electronic device, comprising a memory and a processor, wherein a computer program is stored in the memory; and the processor is configured to run the computer program to execute the method as claimed in claim 9.

* * * * *